(12) United States Patent
Yang et al.

(10) Patent No.: US 11,359,799 B1
(45) Date of Patent: Jun. 14, 2022

(54) LAMP UNIT AND LAMP AIMING APPARATUS

(71) Applicant: HYUNDAI MOBIS CO., LTD., Seoul (KR)

(72) Inventors: Deok Ii Yang, Yongin-si (KR); Kyu Tek Yun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/562,810

(22) Filed: Dec. 27, 2021

(30) Foreign Application Priority Data

Jul. 16, 2021 (KR) .................... 10-2021-0093813

(51) Int. Cl.
*F21V 19/02* (2006.01)
*B60Q 1/06* (2006.01)
*B60Q 1/068* (2006.01)

(52) U.S. Cl.
CPC .............. *F21V 19/02* (2013.01); *B60Q 1/06* (2013.01); *B60Q 1/068* (2013.01); *B60Q 1/0686* (2013.01)

(58) Field of Classification Search
CPC ........... F21V 19/02; B60Q 1/06; B60Q 1/068; B60Q 1/0686

USPC ................................ 362/418, 523, 524, 529
See application file for complete search history.

(56) References Cited

U.S. PATENT DOCUMENTS 5,660,455 A * 8/1997 Tsukamoto ............ B60Q 1/068
362/284
5,951,157 A * 9/1999 Shirai ................. B60Q 1/0683
362/284

FOREIGN PATENT DOCUMENTS

KR        100221273 B1 *  9/1999

* cited by examiner

*Primary Examiner* — Laura K Tso
(74) *Attorney, Agent, or Firm* — DLA Piper LLP (US)

(57) ABSTRACT

A lamp aiming apparatus including: an aiming rod configured to move between a first position at which the aiming rod is spaced apart from an aiming bolt and a second position at which the aiming rod engages with the aiming bolt; a support bracket disposed on the lamp module and configured to support the aiming rod on the lamp module; and a locking part configured to lock the aiming rod to the support bracket when the aiming rod moves to the second position from the first position, thereby simplifying a process of assembling a lamp and improving assembly properties and workability.

13 Claims, 7 Drawing Sheets

LAMP UNIT AND LAMP AIMING APPARATUS

CROSS-REFERENCE TO RELATED APPLICATION

This application claims priority to and the benefit of Korean Patent Application No. 10-2021-0093813 filed in the Korean Intellectual Property Office on Jul. 16, 2021, the entire contents of which are incorporated herein by reference.

TECHNICAL FIELD

The present disclosure relates to a lamp unit and a lamp aiming apparatus, and more particularly, to a lamp unit and a lamp aiming apparatus, which are capable of simplifying a process of assembling a lamp and improving assembly properties and workability.

BACKGROUND ART

In general, a vehicle is provided with various types of lamps having a lighting function and a signal function. The lighting function allows a driver to easily recognize objects positioned around the vehicle during the nighttime driving. The signal function informs drivers in other vehicles and pedestrians on the road of a traveling state of the host vehicle.

For example, the lamps of the vehicle may include headlamps (or headlights) and fog lamps used for the lighting function, and turn signal lamps, tail lamps, brake lamps, and side markers used for the signal function. Regulations define the installation criteria and specifications of these lamps for a vehicle to enable the lamps to sufficiently exhibit the functions.

Among the lamps for a vehicle, the headlamp provides a low-beam pattern or a high-beam pattern to ensure a front visual field of the driver while the vehicle travels at night. The headlamp plays a significantly important role in safe driving.

Meanwhile, when a light emission direction of a headlamp deviates from an initially set direction due to vibration or impact generated while the vehicle travels, light blindness may be caused to a driver in a front (or opposite) vehicle, or a visual field may deteriorate. When the light emission direction of the headlamp deviates from the initially set direction, an aiming operation of adjusting the light emission direction of the headlamp to the initially set direction needs to be performed.

The aiming operation for the headlamp may be performed as an aiming rod disposed in an engine room of a vehicle is rotated, an aiming bolt engaging with the aiming rod (e.g., an aiming bolt having a crown gear engaging with the aiming rod) is rotated, and a reflector of the headlamp is operated in conjunction with (rotated by) the rotation of the aiming bolt.

However, because of the nature of the process of assembling the headlamp in the related art, the aiming rod needs to be assembled using a separate support bracket after the aiming bolt is fastened, which complicates the assembly process.

That is, the aiming bolt needs to be rotated and fastened at a sufficient rotational speed so that the aiming bolt connected to the lamp module may be positioned at a predefined fastening completion point. However, the aiming rod needs to be rotated to rotate the aiming bolt in the state in which the aiming bolt and the aiming rod engage with each other. Further, it is difficult to sufficiently rotate the aiming bolt by rotating the aiming rod. Therefore, after the aiming bolt is fastened, the aiming rod and the support bracket for supporting the aiming rod need to be additionally assembled (the support bracket is fastened to the lamp module using a fastening bolt) at the final step. As a result, there is a problem in that assembly properties, workability, and productivity deteriorate in a final assembly line (e.g., a line in which the headlamp is assembled to a vehicle body).

In addition, in the related art, it is difficult to provide the aiming rod and the support bracket in the form of an assembly integrated with the lamp module (e.g., a headlamp module), and the aiming rod and the support bracket need to be supplied and managed separately from the lamp module, which complicates management and assembly processes. For this reason, there is a problem in that the time and cost required to assemble the headlamp are increased.

Therefore, recently, various studies have been conducted to simplify the process of assembling the lamp and improve the assembly properties and workability, but the study results are still insufficient. Accordingly, there is a need to develop a technology to simplify the process of assembling the lamp and improve the assembly properties and workability.

SUMMARY

The present disclosure has been made in an effort to provide a lamp unit and a lamp aiming apparatus, which are capable of simplifying a process of assembling a lamp and improving assembly properties and workability.

The present disclosure has also been made in an effort to modularize and supply an aiming rod and a support bracket in a state of being temporarily assembled with a lamp module and simplify an assembly process in a final assembly line for assembling a lamp to a vehicle body.

The present disclosure has also been made in an effort to exclude a process of fastening a support bracket with a fastening bolt in a final assembly line and completely assemble a lamp only by performing a simple task of pushing an aiming rod.

The present disclosure has also been made in an effort to reduce the time and cost required for a process of assembling a lamp.

The objects to be achieved by the embodiments are not limited to the above-mentioned objects, but also include objects or effects that may be understood from the solutions or embodiments described below.

An exemplary embodiment of the present disclosure provides a lamp aiming apparatus, which controls an aiming bolt for adjusting a light emission direction of a lamp module, the lamp aiming apparatus including: an aiming rod configured to move between a first position at which the aiming rod is spaced apart from the aiming bolt and a second position at which the aiming rod engages with the aiming bolt; a support bracket disposed on the lamp module and configured to support the aiming rod on the lamp module; and a locking part configured to lock the aiming rod to the support bracket when the aiming rod moves to the second position from the first position.

This is to simplify a process of assembling a lamp and improve assembly properties and workability.

That is, in the related art, after the aiming bolt is fastened, the support bracket for supporting the aiming rod needs to be additionally assembled (the support bracket is fastened to the lamp module using a fastening bolt) at the final step in the state in which the aiming bolt engages with the aiming bolt. As a result, there is a problem in that assembly properties, workability, and productivity deteriorate in a final assembly line (e.g., a line in which the headlamp is assembled to a vehicle body).

In addition, in the related art, it is difficult to provide the aiming rod and the support bracket in the form of an assembly integrated with the lamp module (e.g., a headlamp module), and the aiming rod and the support bracket need to be supplied and managed separately from the lamp module, which complicates management and assembly processes. For this reason, there is a problem in that the time and cost required to assemble the headlamp are increased.

However, according to the embodiment of the present disclosure, the sufficient rotation of the aiming bolt is allowed at the first position at which the aiming rod is spaced apart from the aiming bolt. Further, the movement of the aiming rod is restricted when the aiming rod is moved to the second position at which the aiming rod engages with the aiming bolt. Therefore, it is possible to obtain an advantageous effect of simplifying the assembly process of assembling the lamp unit, including the lamp module and the lamp aiming apparatus, to the vehicle body and improving the assembly properties and workability.

Among other things, according to the embodiment of the present disclosure, the aiming rod and the support bracket are modularized and supplied in the state of being temporarily assembled with the lamp module (the aiming rod and the support bracket are supplied in the state in which the support bracket is completely fastened in advance to the lamp module before the aiming bolt is completely fastened). Therefore, it is possible to exclude the process of fastening the support bracket to the lamp module using the fastening bolt in the final assembly line.

In addition, it is possible to completely assemble the aiming rod only by performing a simple task of pushing the aiming rod in the final assembly line. Therefore, it is possible to obtain an advantageous effect of simplifying the process of assembling the lamp unit in the final assembly line and improving the assembly properties and workability.

The locking part may have various structures capable of supporting the aiming rod at the first position and locking the aiming rod at the second position.

For example, the locking part may include: a catching protrusion disposed on an outer surface of the aiming rod; a support protrusion disposed on an inner surface of the support bracket and configured to support the catching protrusion at the first position; and a catching hole provided in the support bracket and configured to lock the catching protrusion at the second position.

In particular, the catching protrusion may be provided in the form of a continuous ring in a circumferential direction of the aiming rod.

Since the catching protrusion is provided in the form of a continuous ring as described above, the catching protrusion may be easily supported on the support protrusion regardless of a rotation angle of the aiming rod with respect to the support bracket.

According to the exemplary embodiment of the present disclosure, the lamp aiming apparatus may include a connecting part having one end connected to the support bracket and the other end disposed in the catching hole. The support protrusion may be disposed at the other end of the connecting part and spaced apart from an inner wall surface of the catching hole.

According to the exemplary embodiment of the present disclosure, the lamp aiming apparatus may include a cut-out slit provided in the support bracket and disposed adjacent to the support protrusion.

Since the cut-out slits are provided at the periphery of the support protrusion as described above, the dynamic properties of the support protrusion (the properties that allow the support protrusion to freely move) relative to the support bracket may be improved.

According to the exemplary embodiment of the present disclosure, the lamp aiming apparatus may include an inclined guide surface disposed on the support protrusion, and the catching protrusion may enter the catching hole along the inclined guide surface.

Since the inclined guide surface is provided on the support protrusion as described above, it is possible to obtain an advantageous effect of minimizing impact and noise caused by the contact between the catching protrusion and the support protrusion and ensuring a smoother movement of the catching protrusion while the catching protrusion climbs over the support protrusion (the aiming rod moves from the first position to the second position).

Another exemplary embodiment of the present disclosure provides a lamp unit including: a lamp module; an aiming bolt connected to the lamp module and configured to adjust a light emission direction of the lamp module; an aiming rod configured to move between a first position at which the aiming rod is spaced apart from the aiming bolt and a second position at which the aiming rod engages with the aiming bolt; a support bracket disposed on the lamp module and configured to support the aiming rod on the lamp module; and a locking part configured to lock the aiming rod to the support bracket when the aiming rod moves to the second position from the first position.

According to the exemplary embodiment of the present disclosure, the locking part may include: a catching protrusion disposed on an outer surface of the aiming rod; a support protrusion disposed on an inner surface of the support bracket and configured to support the catching protrusion at the first position; and a catching hole provided in the support bracket and configured to lock the catching protrusion at the second position.

According to the exemplary embodiment of the present disclosure, the lamp unit may include a connecting part having one end connected to the support bracket and the other end disposed in the catching hole. The support protrusion may be disposed at the other end of the connecting part and spaced apart from an inner wall surface of the catching hole.

According to the exemplary embodiment of the present disclosure, the lamp unit may include an inclined guide surface disposed on the support protrusion, and the catching protrusion may enter the catching hole along the inclined guide surface.

According to the exemplary embodiment of the present disclosure, the lamp unit may include a cut-out slit provided in the support bracket and disposed adjacent to the support protrusion.

According to the exemplary embodiment of the present disclosure, the support bracket may be provided in a state of being fastened in advance to the lamp module before the aiming rod moves from the first position to the second position.

DETAILED DESCRIPTION

Figure 1:
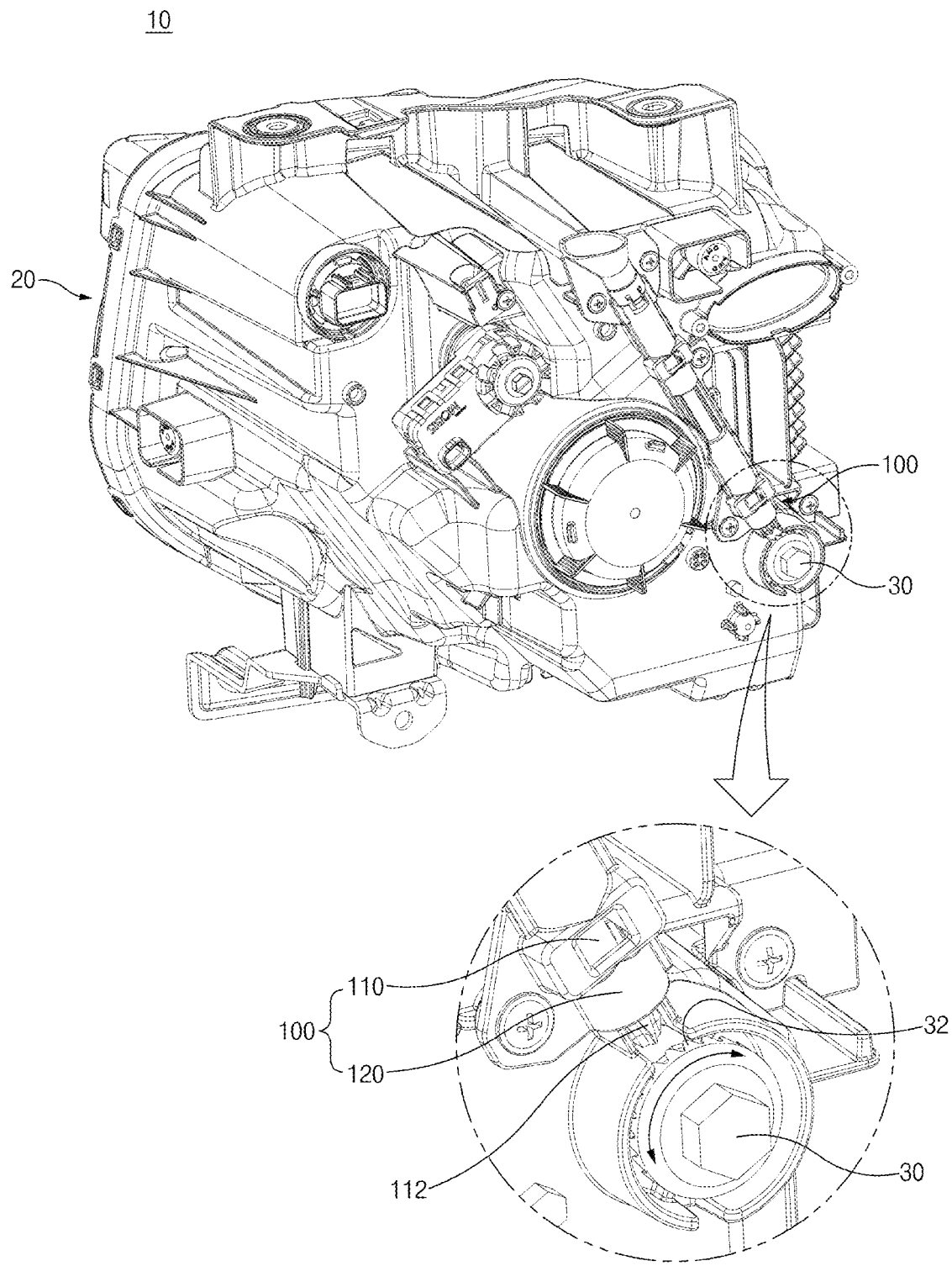
FIG. 1 is a view for explaining a lamp unit according to an embodiment of the present disclosure.
Figure 2:
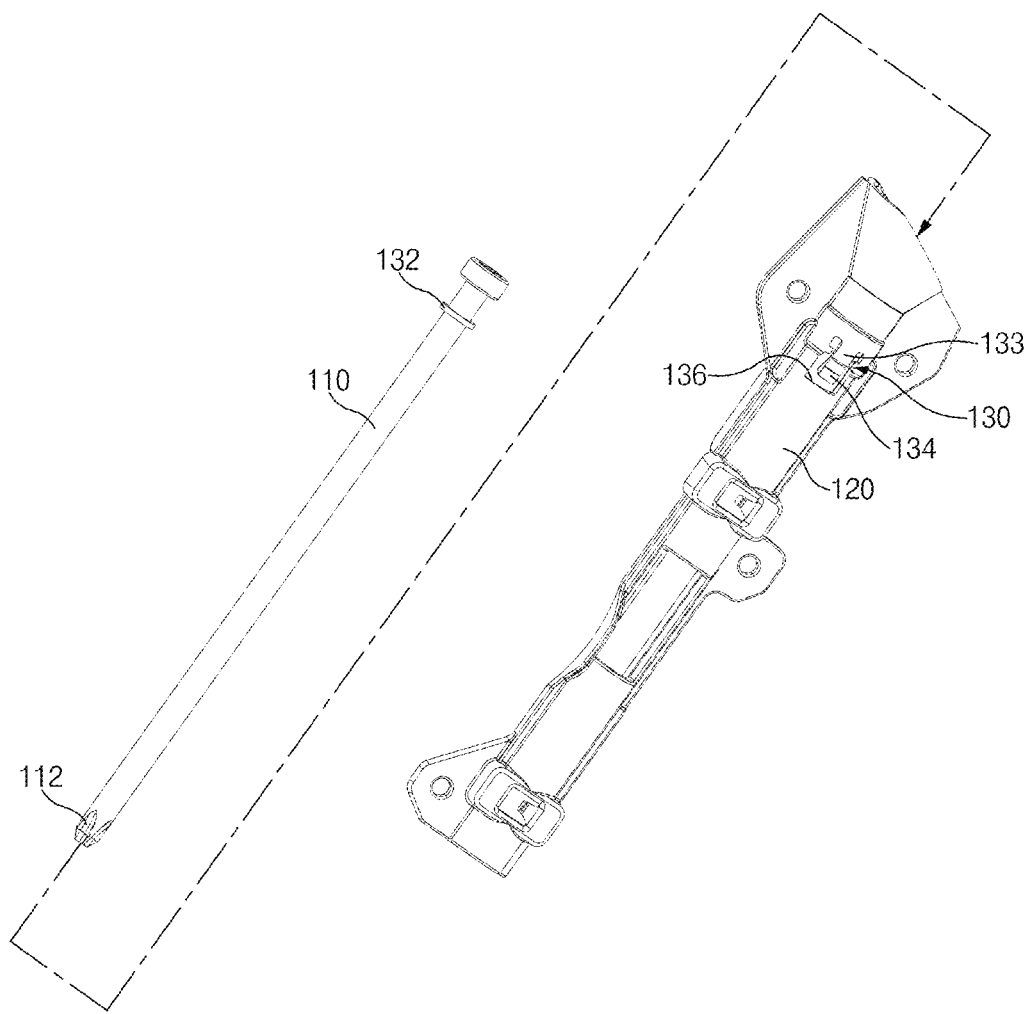
FIG. 2 is a view for explaining a lamp aiming apparatus according to the embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, a lamp aiming apparatus 100 according to an embodiment of the present disclosure includes: an aiming rod 110 configured to move between a first position at which the aiming rod 110 is spaced apart from an aiming bolt 30 and a second position at which the aiming rod 110 engages with the aiming bolt 30; a support bracket 120 disposed on a lamp module 20 and configured to support the aiming rod 110 on the lamp module 20; and a locking part 130 configured to lock the aiming rod 110 to the support bracket 120 when the aiming rod 110 moves to the second position from the first position.

For reference, the lamp aiming apparatus 100 according to the embodiment of the present disclosure may be mainly used to adjust a light emission direction of a lamp used for a lighting function (e.g., headlamps or fog lamps) or for a signal function (e.g., turn signal lamps, tail lamps, brake lamps, or side markers). The present disclosure is not restricted or limited by the type and structure of the lamp (the lamp module) to which the lamp aiming apparatus 100 is applied.

Hereinafter, an example will be described in which the lamp aiming apparatus 100 including the aiming rod 110, the support bracket 120, and the locking part 130 constitutes a lamp unit 10 together with the lamp module 20 and the aiming bolt 30.

More specifically, the lamp unit 10 includes: the lamp module 20; the aiming bolt 30 connected to the lamp module 20 and configured to adjust the light emission direction of the lamp module 20; the aiming rod 110 configured to move between the first position at which the aiming rod 110 is spaced apart from the aiming bolt 30 and a second position at which the aiming bolt 30 engages with the aiming bolt 30; the support bracket 120 disposed on the lamp module 20 and configured to support the aiming rod 110 on the lamp module 20; and the locking part 130 configured to lock the aiming rod 110 to the support bracket 120 when the aiming rod 110 moves to the second position from the first position.

The lamp module 20 may have various structures capable of emitting light. The present disclosure is not restricted or limited by the type and structure of the lamp module 20.

For example, the lamp module 20 may include a lamp housing (not illustrated), a light source (not illustrated) disposed in the lamp housing, and a reflector (not illustrated) configured to reflect forward the light emitted from the light source.

The lamp housing may be variously changed in structure and shape in accordance with required conditions and design specifications. The present disclosure is not restricted or limited by the structure and shape of the lamp housing.

A light emitting diode (LED), which is a semiconductor light emitting element, may be used as the light source, or a plurality of LEDs configured to emit light beams with an identical color or different colors may be used in accordance with required conditions and design specifications. According to another embodiment of the present disclosure, a fluorescent lamp, an incandescent lamp, or a halogen lamp may be used as the light source.

The reflector may have various structures capable of reflecting forward the light emitted from the light source, and the present disclosure is not restricted or limited by the shape and the structure of the reflector.

For example, the reflector may be formed to have an inner surface formed in the form of an elliptically curved surface or a free curved surface and having a reflective layer (reflective surface) so as to reflect the light generated from the light source toward a location in front of the lamp for a vehicle. Alternatively, the reflector may have a structure having a single focal point or multiple focal points. In particular, the light source may be disposed on the focal point of the reflector or in the vicinity of the focal point of the reflector.

For reference, in the embodiment of the present disclosure, the configuration in which the reflector reflects forward the light emitted from the light source may mean that the reflector reflects the light in a direction in which the light is emitted from the lamp module 10. The direction represented by the forward direction may be changed in accordance with the installation position and direction of the lamp module 10. For example, the reflector may reflect the light in a direction in which the vehicle moves.

The aiming bolt 30 adjusts the light emission direction of the lamp module 20 by adjusting a posture (position or angle) of the reflector.

The connection structure between the aiming bolt 30 and the reflector may be variously changed in accordance with required conditions and design specifications. The present disclosure is not restricted or limited by the connection structure between the aiming bolt 30 and the reflector.

For example, the posture of the reflector may be changed as the reflector coupled to (or engaging with) the aiming bolt 30 is rotated by the rotation of the aiming bolt 30.

The aiming bolt 30 may be fastened to the lamp housing by rotating (e.g., by screw fastening). A bolt gear portion 32 (e.g., a crown gear) may be provided at one end of the aiming bolt 30 and engage with the aiming rod 110 (a rod gear portion of the aiming rod).

The aiming rod 110 may engage with the aiming bolt 30, and the aiming bolt 30 rotates in conjunction with the rotation of the aiming rod 110.

The aiming rod 110 may have various structures capable of engaging with the aiming bolt 30. The present disclosure is not restricted or limited by the structure and shape of the aiming rod 110.

For example, the aiming rod 110 may be provided in the form of a straight rod having a predetermined length. A rod gear portion 112, which engages with the bolt gear portion 32, may be provided at an end of the aiming rod 110.

In this case, the engagement structures (shapes of the gear portions) and gear ratios of the rod gear portion 112 and the bolt gear portion 32 may be variously changed in accordance with required conditions and design specifications.

The support bracket 120 is coupled (fastened) to the lamp module 20 and supports the aiming rod 110 on the lamp module 20 so that the aiming rod 110 is rotatable.

The support bracket 120 may have various structures capable of supporting the aiming rod 110.

For example, the support bracket may have an approximately hollow cylindrical shape having a receiving space therein. The aiming rod 110 may engage with the aiming bolt 30 in a state in which the aiming rod 110 penetrates the support bracket 120.

In particular, the support bracket 120 is fastened in advance to the lamp module 20 before the aiming rod 110 moves from the first position to the second position.

In this case, the state in which the support bracket 120 is fastened to the lamp module 20 may be understood as a state in which the support bracket 120 is fixed to the lamp module 20 using fastening bolts (e.g., four fastening bolts), i.e., a state in which the support bracket 120 is completely assembled with the lamp module 20.

The aiming rod 110 may rectilinearly move between the first position at which the aiming rod 110 is spaced apart from the aiming bolt 30 and the second position at which the aiming rod 110 engages with the aiming bolt 30.

Figure 3:
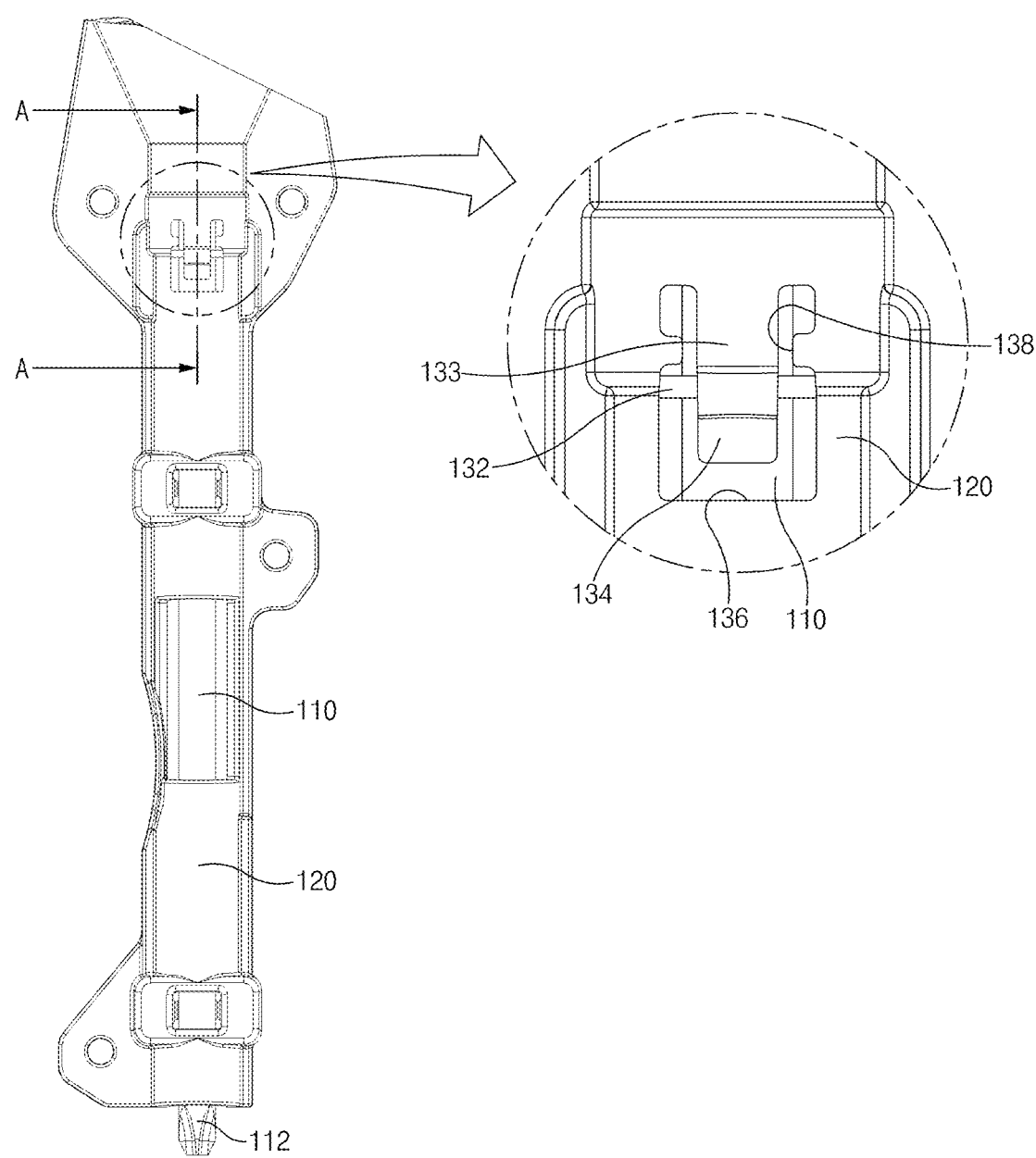
FIG. 3 is a view for explaining a state in which an aiming rod of the lamp aiming apparatus according to the embodiment of the present disclosure is disposed at a first position.
Figure 4:
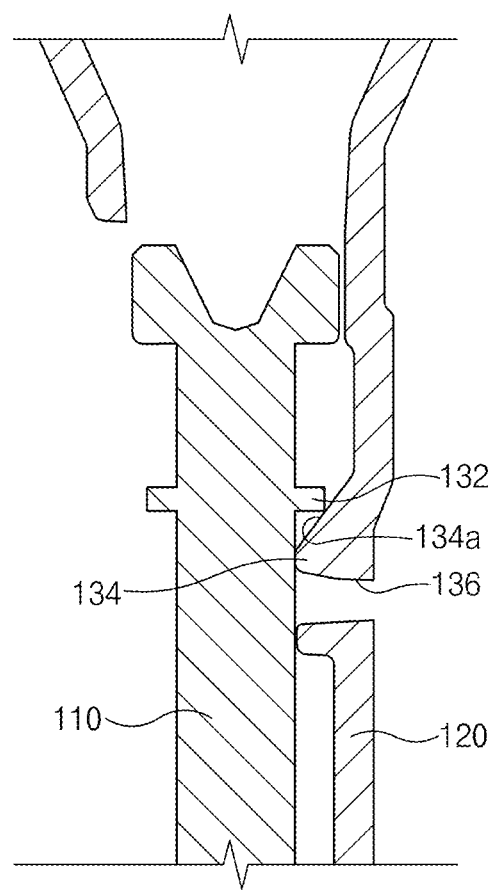
FIG. 4 is a cross-sectional view taken along line 'A-A' in FIG. 3.

In this case, the state in which the aiming rod 110 is positioned at the first position at which the aiming rod 110 is spaced apart from the aiming bolt 30 may be understood as a state (temporarily assembled state) in which the aiming rod 110 is accommodated in the support bracket 120 and the rod gear portion 112 is spaced apart from the bolt gear portion 32 as illustrated in FIGS. 3 and 4. In addition, in the state in which the aiming rod 110 is disposed at the first position, the engagement between the aiming rod 110 and the aiming bolt 30 may be released, such that a free rotation of the aiming bolt 30 may be ensured.

Figure 5:
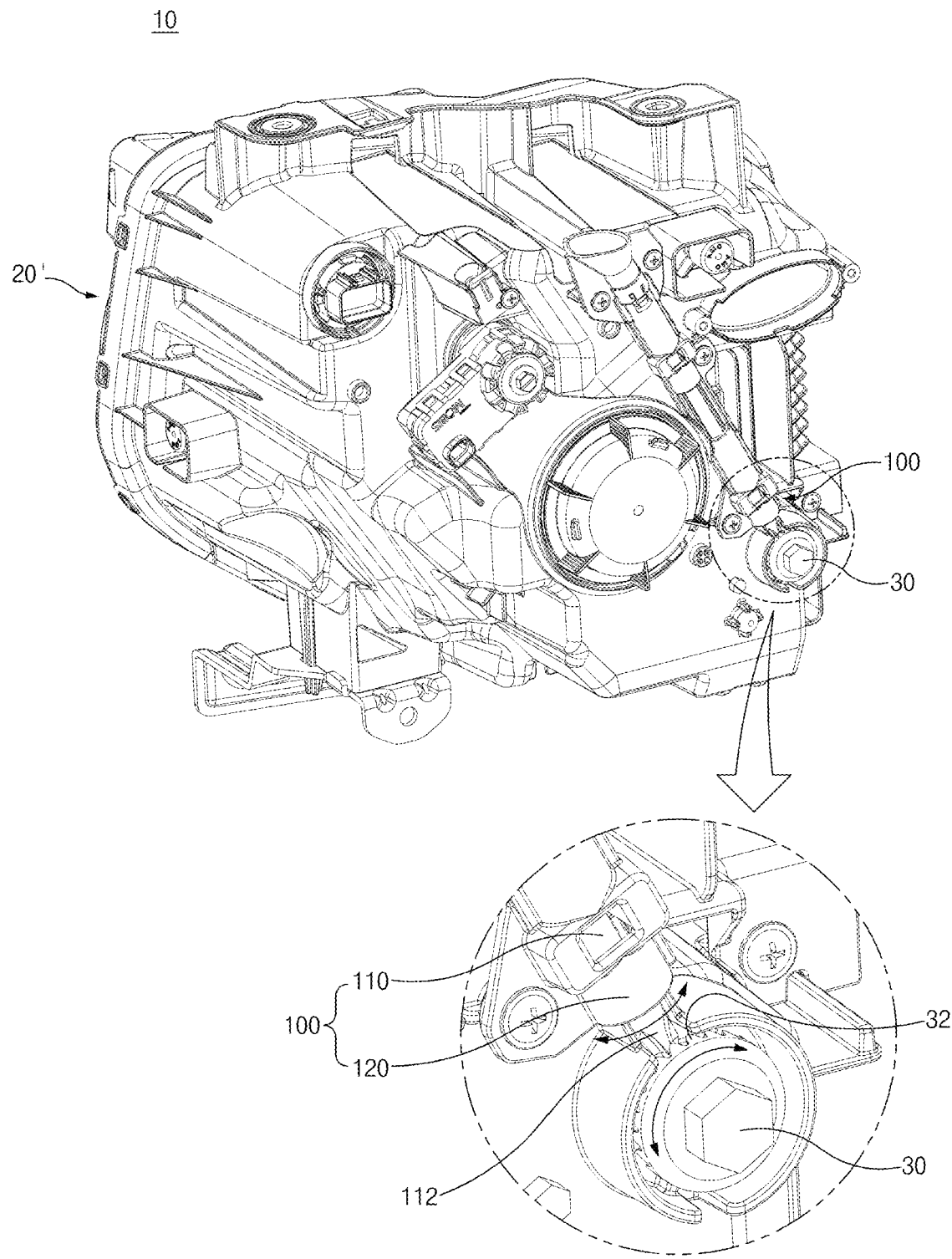
FIGS. 5 and 6 are views for explaining states in which the aiming rod of the lamp aiming apparatus according to the embodiment of the present disclosure is disposed at a second position.
Figure 6:
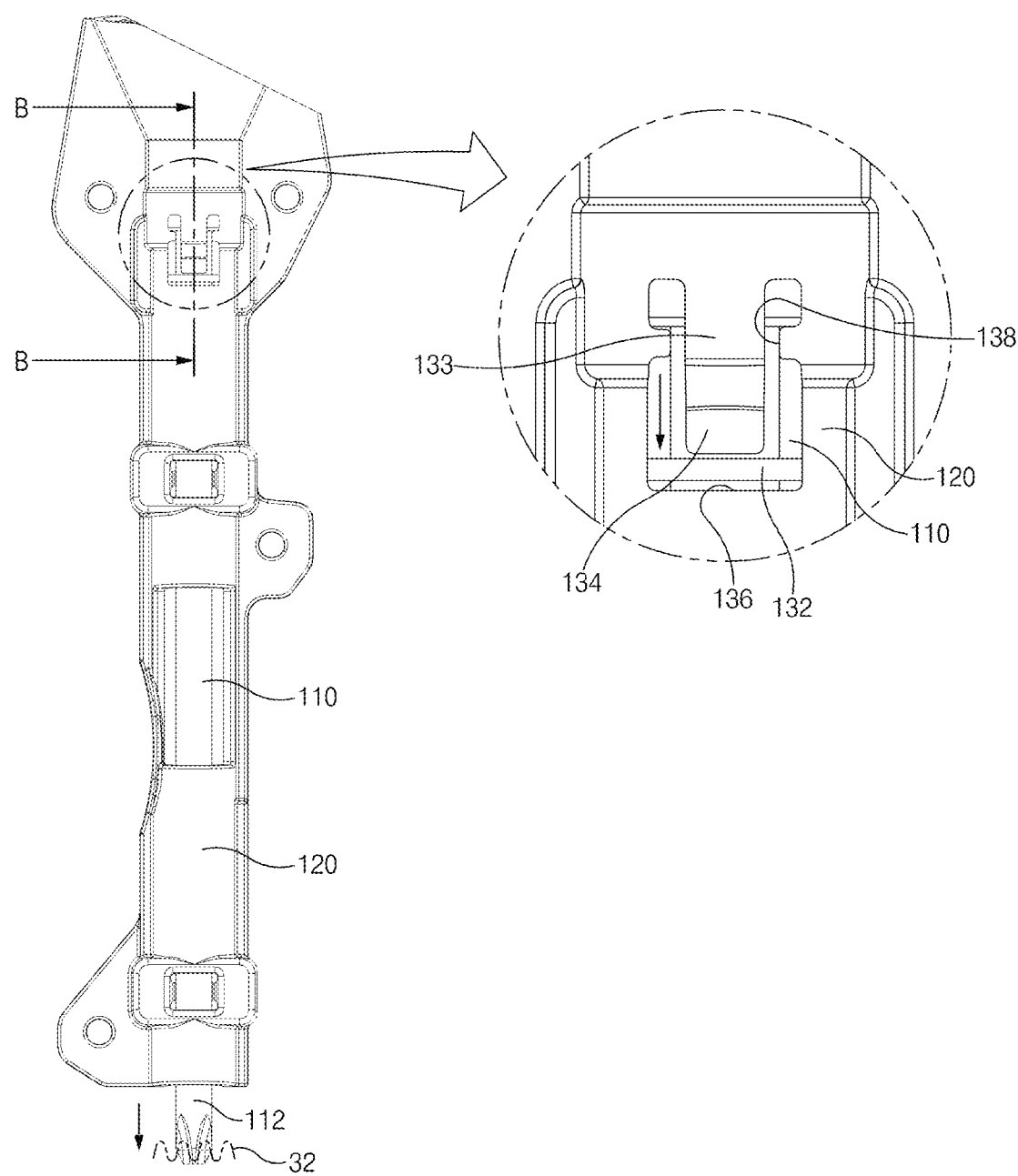
Figure 7:
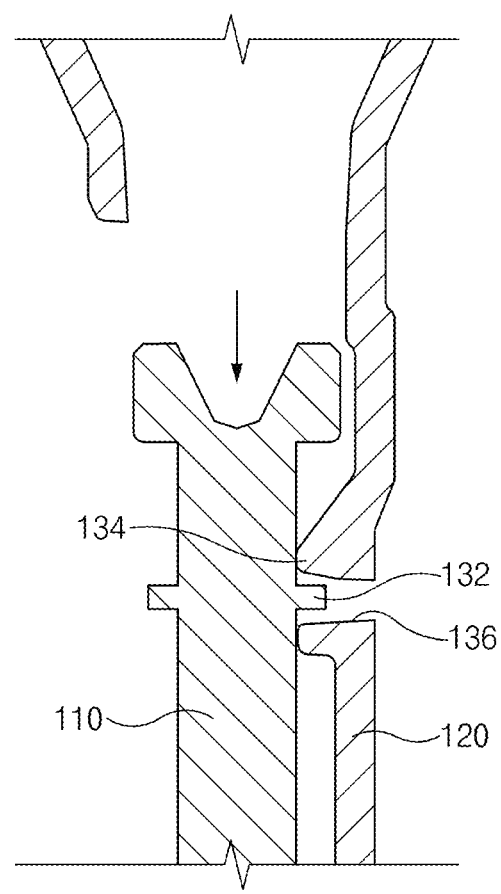
FIG. 7 is a cross-sectional view taken along line 'B-B' in FIG. 6.

In contrast, the state in which the aiming rod 110 is positioned at the second position at which the aiming rod 110 engages with the aiming bolt 30 may be understood as a state (completely assembled state) in which the aiming rod 110 is accommodated in the support bracket 120 and the rod gear portion 112 engages with the bolt gear portion 32 as illustrated in FIGS. 5 to 7.

The locking part 130 temporarily supports the arrangement state of the aiming rod 110 when the aiming rod 110 is positioned at the first position. The locking part 130 locks the aiming rod 110 to the support bracket 120 when the aiming rod 110 moves to the second position from the first position.

In this case, the configuration in which the aiming rod 110 is locked to the support bracket 120 in the state in which the aiming rod 110 is moved to the second position may mean that the aiming rod 110 is inhibited from moving in a longitudinal direction of the aiming rod 110 in the state in which the rod gear portion 112 engages with the bolt gear portion 32 (see FIGS. 5 to 7).

The locking part 130 may have various structures capable of locking the aiming rod 110 at the second position.

For example, the locking part 130 may include a catching protrusion 132 disposed on an outer surface of the aiming rod 110, a support protrusion 134 disposed on an inner surface of the support bracket 120 and configured to support the catching protrusion 132 at the first position, and a catching hole 136 provided in the support bracket 120 and configured to lock the catching protrusion 132 at the second position.

The catching protrusion 132 may protrude from the outer surface (e.g., an outer circumferential surface) of the aiming rod 110. The present disclosure is not restricted or limited by the structure and shape of the catching protrusion 132.

In particular, the catching protrusion 132 may be provided in the form of a continuous ring in a circumferential direction of the aiming rod 110.

Since the catching protrusion 132 is provided in the form of a continuous ring as described above, the catching protrusion 132 may be easily supported on the support protrusion 134 regardless of a rotation angle of the aiming rod 110 with respect to the support bracket 120.

According to another embodiment of the present disclosure, the catching protrusion may be partially provided on a particular site in the circumferential direction of the aiming rod. However, if the catching protrusion is partially provided on the particular site, the catching protrusion may be supported on the support protrusion only in a state in which the aiming rod is rotated so that the catching protrusion faces (may come into contact with) the support protrusion. As a result, the rotation angle of the aiming rod with respect to the support bracket may be restricted.

In contrast, when the catching protrusion 132 is provided in the form of a continuous ring, the catching protrusion 132 may be supported on the support protrusion 134 regardless of the rotation angle of the aiming rod 110 with respect to the support bracket 120. Therefore, the catching protrusion 132 may be provided in the form of a continuous ring.

The support protrusion 134 supports the catching protrusion 132 in the state in which the aiming rod 110 is positioned at the first position.

The support protrusion 134 may protrude from the inner surface (e.g., an inner circumferential surface) of the support bracket 120. The present disclosure is not restricted or limited by the structure and shape of the support protrusion 134.

For example, the support protrusion 134 may protrude to have a height that allows the support protrusion 134 to come into contact with the outer circumferential surface of the aiming rod 110 (e.g., the contact that may allow the rectilinear movement of the aiming rod).

According to the exemplary embodiment of the present disclosure, the lamp aiming apparatus 100 may include a connecting part 133 having one end connected to the support bracket 120 and the other end disposed in the catching hole 136. The support protrusion 134 may be disposed at the other end of the connecting part 133 and spaced apart from an inner wall surface of the catching hole 136.

The connecting part 133 may be connected to the support bracket 120 while defining a kind of cantilevered beam. More specifically, one end (e.g., an upper end based on FIG. 3) of the connecting part 133 may be fixed to the support bracket 120, and the other end (e.g., a lower end based on FIG. 3) of the connecting part 133 may be disposed as a free end. The catching protrusion 132 may elastically move (elastically move in the radial direction of the aiming rod) based on one end of the connecting part 133.

According to the exemplary embodiment of the present disclosure, the lamp aiming apparatus 100 may include cut-out slits 138 disposed adjacent to the support protrusion 134 and provided in the support bracket 120.

The cut-out slits 138 may be made by partially removing (cutting) a part of the support bracket 120. The present disclosure is not restricted or limited by the shape and structure of the cut-out slit 138.

For example, the cut-out slits 138 may be disposed at two left and right sides of the support protrusion 134 based on the support protrusion 134 and provided in an upward/downward direction (based on FIG. 3).

According to another embodiment of the present disclosure, the cut-out slit may be provided in a leftward/rightward direction or other directions based on the support protrusion. Alternatively, the cut-out slit may have a curved shape such as an 'S' shape or a 'C' shape.

Since the cut-out slits 138 are provided at the periphery of the support protrusion 134 as described above, the dynamic properties of the support protrusion 134 (the properties that allow the support protrusion 134 to freely move) relative to the support bracket 120 may be improved. Therefore, the catching protrusion 132 may elastically climb over the support protrusion 134 in a snap-fit manner and then be accommodated in the catching hole 136 while the aiming rod 110 moves from the first position to the second position.

In particular, the lamp aiming apparatus 100 may include an inclined guide surface 134*a* provided on the support protrusion 134. The catching protrusion 132 may enter the catching hole 136 along the inclined guide surface 134*a*.

The inclined guide surface 134*a* may be provided in the form of a curved or flat surface. The present disclosure is not restricted or limited by the angle and structure of the inclined guide surface 134*a*.

Since the inclined guide surface 134*a* is provided on the support protrusion 134 as described above, it is possible to obtain an advantageous effect of minimizing impact and noise caused by the contact between the catching protrusion 132 and the support protrusion 134 and ensuring a smoother movement of the catching protrusion 132 while the catching protrusion 132 climbs over the support protrusion 134 (the aiming rod 110 moves from the first position to the second position).

The catching hole 136 is provided in the support bracket 120 to lock the catching protrusion 132 in the state in which the aiming rod 110 is moved to the second position.

The catching hole 136 may have various structures capable of locking the catching protrusion 132. The present disclosure is not restricted or limited by the structure and shape of the catching hole 136.

For example, the catching hole 136 may penetrate a wall surface of the support bracket 120 and have an approximately quadrangular hole having a larger size than the support protrusion 134. The support protrusion 134 may be disposed at an approximately central portion of the catching hole 136 and spaced apart from the inner wall surface of the catching hole 136.

According to another embodiment of the present disclosure, instead of the catching hole, a catching groove having a recessed groove shape may be provided in an inner surface of the support bracket.

Referring to FIGS. 1 and 3 to 4, the aiming rod 110, together with the support bracket 120, may be modularized in a state of being temporarily assembled with the lamp module 20, and then supplied to the final assembly line (the final assembly line for assembling the lamp unit to the vehicle body). In this case, the aiming rod 110 and the support bracket 120 may be supplied in the state in which the catching protrusion 132 is supported on the support protrusion 134 without being accommodated in the catching hole 136.

Referring to FIGS. 5 to 7, in the final assembly line, the aiming bolt 30 may be completely fastened by being sufficiently rotated. When an uppermost end of the aiming rod 110 is pushed after the aiming bolt 30 is completely fastened, the aiming rod 110 moves from the first position to the second position. At the same time, the catching protrusion 132 is accommodated in (locked by) the catching groove, such that the aiming rod 110 may be completely assembled.

According to the embodiment of the present disclosure described above, the aiming rod 110 and the support bracket 120 are modularized and supplied in the state of being temporarily assembled with the lamp module 20 (the aiming rod 110 and the support bracket 120 are supplied in the state in which the support bracket 120 is completely fastened in advance to the lamp module 20 before the aiming bolt 30 is completely fastened). Therefore, it is possible to exclude the process of fastening the support bracket 120 to the lamp module 20 using the fastening bolt in the final assembly line. Accordingly, it is possible to obtain an advantageous effect of simplifying the process of assembling the lamp unit 10, including the lamp module 20 and the lamp aiming apparatus 100, to the vehicle body and improving the assembly properties and workability.

According to the embodiment of the present disclosure described above, it is possible to obtain an advantageous effect of simplifying the process of assembling the lamp and improving the assembly properties and workability.

In particular, according to the embodiment of the present disclosure, it is possible to obtain an advantageous effect of modularizing and supplying the aiming rod and the support bracket in the state of being temporarily assembled with the lamp module and simplifying the assembly process in the final assembly line for assembling the lamp to the vehicle body.

Moreover, according to the embodiment of the present disclosure, it is possible to exclude the process of fastening the support bracket with the fastening bolt in the final assembly line and completely assemble the lamp only by performing the simple task of pushing the aiming rod.

In addition, according to the embodiment of the present disclosure, it is possible to obtain an advantageous effect of reducing the time and cost required for the process of assembling the lamp.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A lamp aiming apparatus, which controls an aiming bolt for adjusting a light emission direction of a lamp module, the lamp aiming apparatus comprising:
    an aiming rod configured to move between a first position at which the aiming rod is spaced apart from the aiming bolt and a second position at which the aiming rod engages with the aiming bolt;
    a support bracket disposed on the lamp module and configured to support the aiming rod on the lamp module; and
    a locking part configured to lock the aiming rod to the support bracket when the aiming rod moves to the second position from the first position.

2. The lamp aiming apparatus of claim 1, wherein the locking part comprises:
    a catching protrusion disposed on an outer surface of the aiming rod;
    a support protrusion disposed on an inner surface of the support bracket and configured to support the catching protrusion at the first position; and
    a catching hole provided in the support bracket and configured to lock the catching protrusion at the second position.

3. The lamp aiming apparatus of claim 2, wherein the catching protrusion is provided as a continuous ring along an outer circumferential surface of the aiming rod.

4. The lamp aiming apparatus of claim 2, comprising:
    a connecting part having one end connected to the support bracket and a second end disposed in the catching hole,
    wherein the support protrusion is disposed at the second end of the connecting part and spaced apart from an inner wall surface of the catching hole.

5. The lamp aiming apparatus of claim 2, comprising:
    an inclined guide surface disposed on the support protrusion,
    wherein the catching protrusion enters the catching hole along the inclined guide surface.

6. The lamp aiming apparatus of claim 2, comprising:
    a cut-out slit provided in the support bracket and disposed adjacent the support protrusion.

7. The lamp aiming apparatus of claim 1, wherein the support bracket is fastened to the lamp module before the aiming rod moves from the first position to the second position.

8. A lamp unit comprising:
    a lamp module;
    an aiming bolt connected to the lamp module and configured to adjust a light emission direction of the lamp module;
    an aiming rod configured to move between a first position at which the aiming rod is spaced apart from the aiming bolt and a second position at which the aiming rod engages with the aiming bolt;
    a support bracket disposed on the lamp module and configured to support the aiming rod on the lamp module; and
    a locking part configured to lock the aiming rod to the support bracket when the aiming rod moves to the second position from the first position.

9. The lamp unit of claim 8, wherein the locking part comprises:
    a catching protrusion disposed on an outer surface of the aiming rod;
    a support protrusion disposed on an inner surface of the support bracket and configured to support the catching protrusion at the first position; and
    a catching hole provided in the support bracket and configured to lock the catching protrusion at the second position.

10. The lamp unit of claim 9, comprising:
    a connecting part having one end connected to the support bracket and a second end disposed in the catching hole,
    wherein the support protrusion is disposed at the second end of the connecting part and spaced apart from an inner wall surface of the catching hole.

11. The lamp unit of claim 9, comprising:
    an inclined guide surface disposed on the support protrusion,
    wherein the catching protrusion enters the catching hole along the inclined guide surface.

12. The lamp unit of claim 9, comprising:
    a cut-out slit provided in the support bracket and disposed adjacent to the support protrusion.

13. The lamp unit of claim 8, wherein the support bracket is fastened to the lamp module before the aiming rod moves from the first position to the second position.

* * * * *